United States Patent [19]

Facha et al.

[11] 4,326,920
[45] Apr. 27, 1982

[54] NUCLEAR REACTOR INCLUDING A REACTOR VESSEL AND TECHNIQUE FOR SUPPORTING THE LATTER

[75] Inventors: Joseph V. Facha, Reseda, Calif.; John P. Cook, Chattanooga, Tenn.; William H. Dauterman, Woodland Hills, Calif.

[73] Assignee: Electric Power Research Institute, Inc., Palo Alto, Calif.

[21] Appl. No.: 32,283

[22] Filed: Apr. 23, 1979

[51] Int. Cl.³ .................... G21C 13/02; G21C 9/00
[52] U.S. Cl. .................................. 376/205; 376/285; 376/463
[58] Field of Search ............. 176/40, 38, 65, 87, 176/62, 63

[56] References Cited

U.S. PATENT DOCUMENTS

| 2,890,009 | 6/1959 | Chapellier | 176/87 |
|---|---|---|---|
| 3,123,328 | 3/1964 | Trickett et al. | 176/87 |
| 3,357,890 | 12/1967 | Friis et al. | 176/87 |
| 3,400,046 | 9/1968 | Barker | 176/65 |
| 3,518,163 | 6/1970 | Boisblanc | 176/40 |
| 3,669,303 | 6/1972 | Launay | 176/87 |
| 3,841,964 | 10/1974 | Dumayne | 176/87 |
| 3,867,254 | 2/1975 | Brandstetter | 176/87 |
| 4,057,162 | 11/1977 | Gross | 176/87 |
| 4,104,120 | 8/1978 | Grubelich | 176/87 |
| 4,115,193 | 9/1978 | Sepelak | 176/87 |

FOREIGN PATENT DOCUMENTS

| 1090344 | 10/1960 | Fed. Rep. of Germany | 176/87 |
|---|---|---|---|
| 1600590 | 4/1970 | Fed. Rep. of Germany | 176/87 |
| 2511134 | 9/1976 | Fed. Rep. of Germany | 176/38 |
| 937588 | 9/1963 | United Kingdom | 176/87 |

Primary Examiner—Harvey E. Behrend
Attorney, Agent, or Firm—Flehr, Hohbach, Test, Albritton & Herbert

[57] ABSTRACT

A pool type nuclear reactor including a number of reactor components located within a vertically extending cavity which is located under a reactor deck arrangement and which is defined by a circumferential cavity wall assembly is disclosed herein. The reactor also includes a reactor vessel separate and distinct from the deck arrangement and the cavity wall assembly for containing the reactor components just recited. This vessel includes a main body located within the cavity and an upper circumferential rim forming a support flange located and interlocked between the deck arrangement and an upper section of the cavity wall assembly whereby to support the vessel body in place.

9 Claims, 6 Drawing Figures

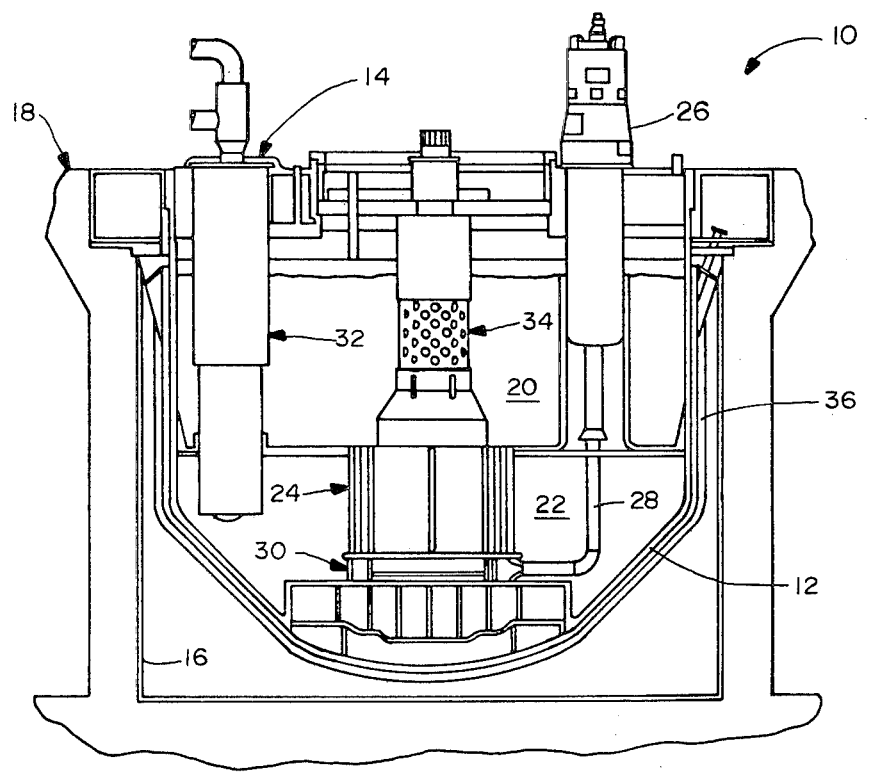
FIG.—1
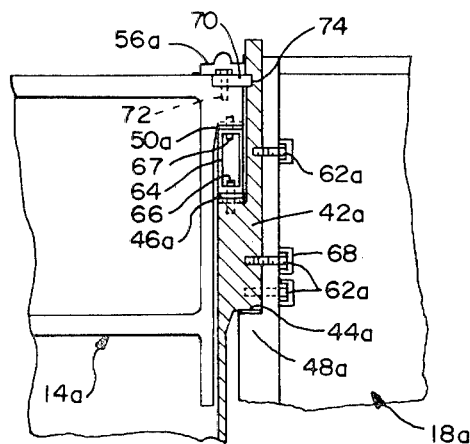
FIG.—3
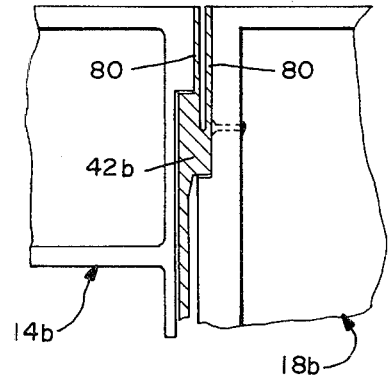
FIG.—4

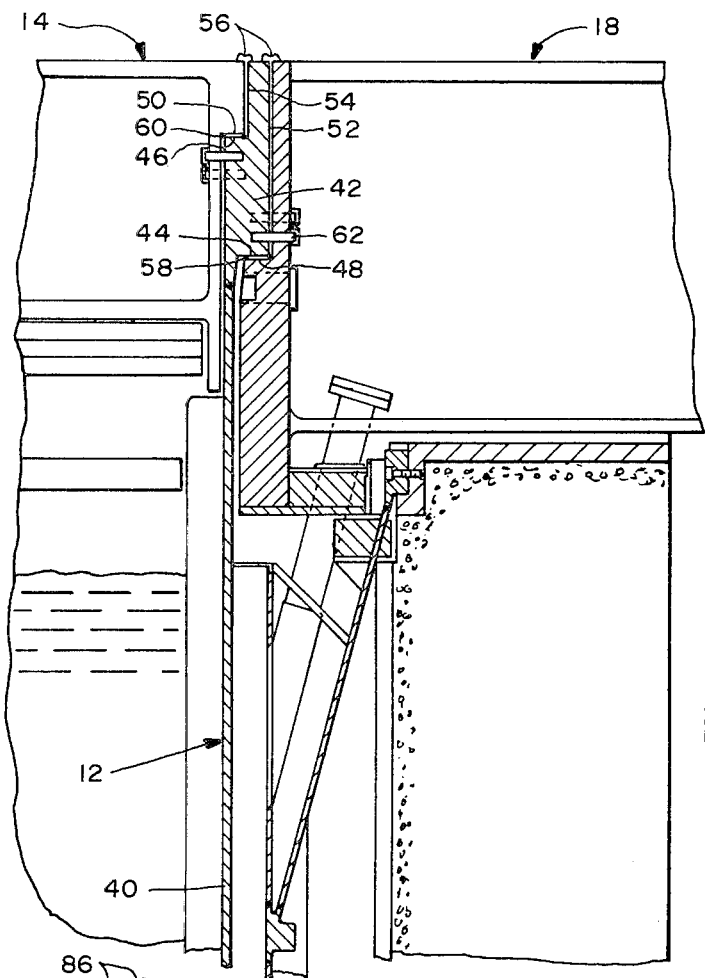
FIG.—2
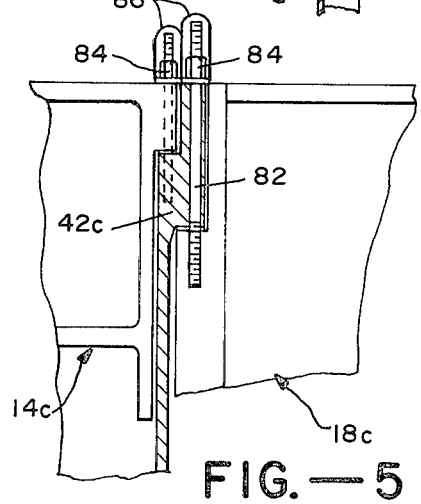
FIG.—5
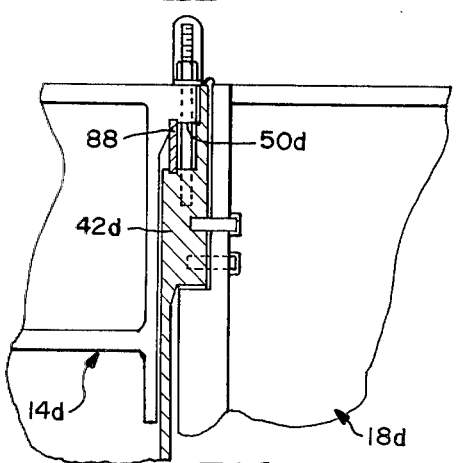
FIG.—6

NUCLEAR REACTOR INCLUDING A REACTOR VESSEL AND TECHNIQUE FOR SUPPORTING THE LATTER

The present invention relates generally to nuclear reactors which include a vertically extending reactor vessel containing a number of reactor components and positioned within a cavity located under a reactor deck arrangement and defined by a circumferential cavity wall assembly. As will be seen hereinafter, the present invention is particularly directed to the reactor vessel itself which is separate and distinct from either the deck arrangement or cavity wall assembly and the way in which the vessel is interlocked between the deck arrangement and wall assembly.

As just stated, the present invention is directed generally to nuclear reactors of the type including a deck arrangement, a reactor vessel located within a cavity under the deck arrangement and a wall assembly defining this cavity. One such nuclear reactor is a pool type liquid metal fast breeder reactor in which the vessel body is constructed of stainless steel. In the past, this vessel body which is extremely large, for example on the order of 70 feet in diameter, has been provided as a joined part of the deck arrangement itself. However, the belief has been that it is not necessary nor economical to provide a stainless steel deck and, hence, the deck is preferably constructed for the most part of carbon steel. However, in order to interconnect the vessel body with the deck, a bimetallic (stainless steel to carbon steel) weld between the two is necessary. This rather large vessel is to be contrasted with the smaller reactor vessels in a loop type nuclear reactor, e.g., those on the order of 25 feet in diameter, which have been made independent of other components, but which have been supported on their underside by support feet.

One drawback in utilizing a bimetallic weld of the type recited relates to the way in which the reactor vessel is inspected for cracks. More specifically, because the vessel body is constructed of stainless steel, present code requirements allow it to be inspected visually which means that simple camera equipment can be utilized for in-service inspections. On the other hand, carbon steel and the carbon steel/stainless steel weld require either ultrasonic or x-ray inspection for cracks. X-ray detection is difficult in the presence of radioactivity and ultrasonic detection is not entirely reliable. However, as will be seen hereinafter, the present invention eliminates the problem by eliminating the bimetallic weld in a manner that is uncomplicated and economical.

In view of the foregoing, one object of the present invention is to provide a nuclear reactor of the general type described above but one which includes a reactor vessel separate and distinct from the rest of the components making up the reactor and particularly its deck arrangement.

Another object of the present invention is to provide a reactor vessel designed without a bimetallic weld, specifically a vessel constructed in its entirety of stainless steel in a preferred embodiment.

Still another object of the present invention is to provide a reactor vessel having a support flange mechanically interlocked with the reactor's deck arrangement and its cavity wall assembly in a way which accomodates thermal displacement and resists seismic forces.

As will be discussed in more detail hereinafter, the reactor vessel which is designed in accordance with the present invention for use in a pool-type reactor but which in a smaller size may be used in a loop type reactor includes a main body located within the cavity defined by its cavity wall assembly and an upper circumferential rim forming a support flange located and interlocked between the deck arrangement and an upper section of the reactor's wall assembly, whereby to support the vessel body in place. In a preferred embodiment, the vessel body and its support flange are formed with one another (welded together) and constructed of stainless steel, thereby eliminating the previously recited bimetallic weld. In addition, the support flange and both the deck arrangement and cavity wall assembly provide cooperating shoulders such that the cavity wall assembly supports the reactor vessel and the support flange at the top of the vessel supports the deck arrangement. At the same time, means are provided for allowing thermal displacement and resisting seismic forces between these components.

The reactor just discussed and its main vessel in particular will be described in more detail hereinafter in conjunction with the drawings wherein:

FIG. 1 is an elevational view, partially in section, of a pool type nuclear reactor including a deck arrangement, cavity wall assembly and a reactor vessel interlocked between the two in accordance with the present invention.

FIG. 2 is an enlarged sectional view showing the top end of the reactor vessel which forms a support flange interlocked between the deck arrangement and wall assembly in accordance with one embodiment of the present invention.

FIGS. 3 through 6 are enlarged vertical sectional views illustrating four different embodiments of the support flange illustrated in FIG. 2 including different ways of interlocking these flanges between the deck arrangement and cavity wall assembly.

Turning now to the drawings, wherein like components are designated by like reference numerals throughout the various figures, a pool type nuclear reactor generally indicated by the reference numeral 10 is illustrated in FIG. 1. In a preferred embodiment, this reactor is a liquid metal fast breeder reactor buy may be of any other type compatible with the present invention to be described hereinafter. The reactor shown in FIG. 1 includes a reactor vessel 12 which is located under a reactor deck arrangement 14 within the vertically extending cavity 16 defined by a circumferential cavity wall assembly 18. As seen in FIG. 1, vessel 12 is separated into two compartments, a top compartment containing a pool of hot sodium generally indicated at 20 and a lower compartment containing a pool of cold sodium generally indicated at 22. Some of the reactor components located within the vessel and contained within these pools include a central core 24 containing both fuel and blanket assemblies (not shown) and a technique for cooling these assemblies by passing liquid coolant, specifically the liquid sodium, across and in contact with the assemblies. This technique utilizes a pump 26, discharge piping 28 and coolant distributing means 30 which together pass sodium from the cold pool through the fuel and blanket assembly for ultimate passage into the hot pool 22. The distributing means may be constructed conventionally or in accordance with co-pending U.S. patent application Ser. No. 132,361, filed Apr. 23, 1979, and entitled "Flow Distribution System for Coolant in a Nuclear Reactor and Method", this application having been assigned to the Assignee of the present application.

Other reactor components include an internal heat exchanger 32 adapted to receive the coolant from the hot pool after the latter passes through the fuel and blanket assemblies, an instrument tree 34 mounted over the core, and other components which may or may not be illustrated but which are not pertinent to the present invention. All of these reactor components including the ones recited above, with the exception of vessel 12 and cooperating support components of deck arrangement 14 and wall assembly 18, may be readily provided by those with ordinary skill in the art and, hence, will not be discussed in detail herein except where necessary for a better understanding of the present invention. During normal operation of the reactor, it is necessary to carry out periodic in-service inspections of the reactor vessel for cracks and the reactor includes suitable access ports for passing suitable equipment in the space between the reactor vessel and a surrounding guard vessel 36 which preferably is supported in place as disclosed in co-pending U.S. patent application, Ser. No. 32,285, filed Apr. 23, 1979, and entitled "Nuclear Reactor Guard Vessel Arrangement" (Att. Docket A-34365), the application being assigned to the Assignee of the present application.

Referring now to FIG. 2, attention is directed to reactor vessel 12 and the way it is supported between deck arrangement 14 and cavity wall assembly 18. As seen in this figure, the vessel includes a main body 40 located within cavity 16 as best seen in FIG. 1 and an upper circumferential rim forming a support flange 42 located and interlocked between the deck arrangement and upper section of the wall assembly, as will be discussed in more detail hereinafter. For the moment, it suffices to say that the reactor vessel, that is, main body 40 and support flange 42 are constructed so as to eliminate the previously described bimetallic weld. In a preferred embodiment, these two components are formed as a single unit, specifically of stainless steel in a preferred embodiment by welding a stainless steel flange 42 to a stainless steel body 40.

As seen best in FIG. 2, the support flange 42, which is shown in cross-section, includes an outer, downwardly directed shoulder 44 and an inner upwardly directed shoulder 46 located vertically above shoulder 44. In the embodiment shown and in a preferred embodiment each of these shoulders extends in a horizontal plane entirely around the vessel. Shoulder 44 is supported on a complimentary, upwardly directed shoulder 48 extending around and forming part of cavity wall assembly 18 and in this way the cavity wall assembly supports the entire vessel. At the same time, the deck arrangement 14 includes a downwardly directed, circumferential shoulder 50 which is complimentary to shoulder 46 and which is supported by the latter such that the reactor vessel and cavity wall assembly support the deck arrangement.

It should be apparent from FIG. 2 that the adjacent surfaces of deck arrangement 14, support flange 42 and cavity wall assembly 18 together define two circumferential joints 52 and 54. In a preferred embodiment of the present invention, these joints are sealed at their top ends by means 56. Each of these means may be of any suitable material compatible with the reactor environment and displaying at least a limited degree of compliance so as to accomodate thermal displacement. In a preferred embodiment, each of these seals extends across and is welded on both sides of a corresponding joint 52 and 54 at the top end of the joint. Moreover, each seal means in a preferred embodiment is sufficiently thin and appropriately designed in cross-section (as shown) to provide at least a limited degree of compliance in the direction transverse to the joints in order to accomodate thermal displacement.

Another technique for accomodating thermal displacement, that is, allowing for differential displacement between the three interfacing components utilizes a slide or slider plate 58 between the shoulders 44 and 48 and a slider plate 60 between the shoulders 46 and 50. Each of these plates is constructed of bronze or other suitable material which allows the confronting shoulders to slide relative to one another. One specific type of slide plate used is a lubricated bronze plate manufactured under the name LUBRITE by Merriman, Inc. (a division of Litton Industries). In this regard, it should be pointed out that while separate slide plates can be provided between the confronting shoulders, it should be understood that the shoulders themselves could be provided with their own coating of suitable slidable material. In addition to these various components just described for accomodating or allowing for thermal displacement, the reactor, in a preferred embodiment, includes a number of shear pins 62 interlocking the support flange with the confronting components of the deck arrangement and cavity wall assembly for resisting seismic forces. The shear pins 62 are aligned with their longitudinal axes directed toward the center of the reactor 10 and lying in horizontal planes so as not to restrain diffential thermal expansion of the cooperating components of deck arrangement 14, support flange 42, and cavity wall assembly 18.

Referring to FIGS. 3 through 6, different configurations of support flange 42 and the cooperating components of deck arrangement 14 and cavity wall assembly 18 are shown. For example, the support flange shown in FIG. 3 and indicated generally by the reference numeral 42a includes a downwardly directed, outer circumferential shoulder 44a corresponding to the previously described shoulder 44 and an upwardly directed, inner circumferential shoulder 46a corresponding to previous shoulder 46. As seen in FIG. 3, shoulder 44a rests on the complimentary shoulder 48a corresponding to previously described shoulder 48 and hence forming part of assembly 18a. On the other hand, shoulder 46a is spaced below the shoulder 50a which corresponds to previous shoulder 50 and which forms part of arrangement 14a. However, these two latter mentioned shoulders do not rest adjacent one another but rather contain a hollow ring 64 constructed of a suitable material for the reactor environment and one which is designed to be sufficiently resilient to accomodate thermal expansion between the two shoulders. In a preferred embodiment, this ring is secured in place by means of a plurality of circumferentially spaced shear pins 66 extending through the bottom of the ring and into shoulder 46a and also a plurality 67 extending from the top of the ring into cooperating shoulder 50a. Additional shear pins 62a corresponding to shear pins 62 extend between support flange 42a and the interfacing component of assembly 18a. These shear pins are preferably covered with carbon steel caps 68. Finally, a shear block 70 extends entirely around a cooperating surface on deck arrangement 14a and is held in place by a plurality of bolts 72. This shear block is covered by an appropriate seal 56a which corresponds in function to previous seal 56. The shear block itself extends into a cooperating slot 74 in the top end of the support flange 42.

Referring to FIG. 4, a support slange 42b is shown and includes outer and inner shoulders which cooperate with complementary shoulders forming a part of deck arrangement 14b and cavity wall assembly 18b in the same way described with respect to FIG. 2. Moreover, a slide plate is provided between each of the pairs of adjacent shoulders. The difference between this configuration and the configuration shown in FIG. 2 resides in the utilization of two circumferential skirts 80 extending vertically upward and forming part of the support flange. These skirts are welded to confronting surfaces on the deck arrangement and wall assembly, as shown, thereby eliminating the necessity for a seal corresponding to the seals 56 while providing compliance for radial displacement and restraint against upward and/or lateral displacement of the parts relative to each other.

FIG . 5 illustrates still another support flange embodiment generally indicated at 42c. This support flange may be identical to flange 42 in cross-sectional configuration and hence includes corresponding outer and inner shoulders cooperating with complementary shoulders provided by deck arrangement 14c and cavity wall assembly 18c. Moreover, a slide plate may be provided between each of the cooperating pairs of shoulders. The difference between this support technique illustrated in FIG. 2 resides in the utilization of a plurality of studs and nuts 82 and 84, respectively. Some of the studs extend through the support flange and into its outer shoulder and into the cavity assembly and some of the studs extend through the deck assembly and into the support flange through its inner shoulder. The adjacent parts are sealed by means of seal rings of carbon steel or other suitable material which bridge over the nuts and the tops of the studs as indicated generally at 86.

Referring finally to FIG. 6, still another support flange 42d is shown between deck arrangement 14d and cavity wall assembly 18d. This support flange includes a bottom section which may be identical to the bottom section of support 42b but includes a top section having an inner, upwardly directed shoulder 50d which is slotted to receive the bottom edge of a resilient support ring 88. The top of this support ring extends in a cooperating slot formed in deck arrangement 14d, as shown. In this embodiment, a stud and nut as well as a top seal are provided in the same manner as described with respect to FIG. 5. Finally, shear pins are provided between the flange and cavity wall assembly as illustrated.

We claim:

1. In a pool type nuclear reactor including a number of reactor components located within a vertically extending cavity which is located under a reactor deck arrangement and which is defined by a circumferential cavity wall assembly, the improvement comprising a reactor vessel separated and distinct from said deck arrangement and said cavity wall assembly for containing said reactor components, said vessel including a main body located within said cavity and an upper circumferential rim formed by a vertically exteded support flange located and interlocked between said deck arrangement and an upper section of said wall assembly, whereby to form a support means for said vessel body within said cavity and said deck arrangement above said vessel body, said support means including a first downwardly directed, circumferential shoulder extending around and forming part of said support flange, a first upwardly directed, circumferential shoulder extending around and forming part of said cavity wall assembly said first upwardly directed shoulder cooperating with said first downwardly directed shoulder for supporting said vessel within said cavity, a second downwardly directed circumferential shoulder extending around and forming part of said deck arrangement, a second upwardly directed, circumferential shoulder extending around and forming part of said support flange on the opposite side of and above said first downwardly directed shoulder but below the top of said flange, said second upwardly directed shoulder cooperating with said second downwardly directed shoulder for supporting said deck arrangement over the main body of said vessel and means for sealing between said support flange and both said deck arrangement and said wall assembly, said sealing means displaying at least a limited degree of compliance whereby to accomodate thermal displacement.

2. The improvement according to claim 1 wherein the main body of said reactor vessel and said support flange are both constructed of stainless steel.

3. The improvement according to claim 2 wherein said main body and support flange are formed as a single unit.

4. The improvement according to claim 4 including a slide plate located between at least one of said pair of cooperating shoulders in order to allow for differential thermal displacement between said one pair of shoulders.

5. The improvement according to claim 4 including a slide plate located between each pair of said cooperating shoulders.

6. The improvement according to claim 1 including shear pins extending between said deck arrangement and flange support and between the latter and said wall assembly for resisting seismic forces.

7. The improvement according to claim 6 wherein the shear pins are aligned with said arrangement, flange, and assembly so as not to restrain differential thermal expansion between these latter components.

8. The improvement according to claim 1 including a compliant ring located between said first shoulders in order to allow for differential thermal displacement.

9. In a pool type nuclear reactor including a number of reactor components located within a vertically extending cavity which is located under a reactor deck arrangement and which is defined by a circumferential cavity wall assembly, the improvement comprising a reactor vessel separate and distinct from said deck arrangement and said cavity wall assembly for containing said reactor components, said vessel including a stainless steel main body located within said cavity, and an upper circumferential rim forming a support flange located between said deck arrangement and an upper section of said cavity wall assembly, a first downwardly directed, circumferential shoulder extending around and forming part of said support flange, a first upwardly directed, circumferential shoulder extending around and forming part of said wall assembly, said upwardly directed shoulder cooperating with said downwardly directed shoulder for supporting said vessel within said cavity, a second downwardly directed, circumferential shoulder extending around and forming part of said deck arrangement, a second upwardly directed, circumferential shoulder extending around and forming part of said support flange on the opposite side of and above said first downwardly directed shoulder but below the top of said flange, said second upwardly directed shoulder cooperating with said second downwardly directed shoulder cooperating with said second downwardly directed shoulder for supporting said deck arrangement over said vessel body, means for sealing between said support flange and both said deck arrangement and said wall assembly, said sealing means displaying at least a limited degree of compliance in order to accomodate thermal displacement, and means located between said first and second shoulders in order to allow for differential thermal displacement between said shoulders, said last mentioned means including a slide plate between said first shoulders and a slide plate between said second shoulders.

* * * * *